(12) United States Patent
Altafi et al.

(10) Patent No.: US 11,548,181 B2
(45) Date of Patent: Jan. 10, 2023

(54) SEPARATING SYSTEM FOR DETACHING CONTAINERS FROM A PLASTIC WEB

(71) Applicants: Abouzar Altafi, Tabriz (IR); Mokhtar Abbasi, Tabriz (IR)

(72) Inventors: Abouzar Altafi, Tabriz (IR); Mokhtar Abbasi, Tabriz (IR)

(73) Assignee: Emamali Abbasi, Tabriz (IR)

( * ) Notice: Subject to any disclaimer, the term of this patent is extended or adjusted under 35 U.S.C. 154(b) by 0 days.

(21) Appl. No.: 17/533,730

(22) Filed: Nov. 23, 2021

(65) Prior Publication Data

US 2022/0080614 A1 Mar. 17, 2022

Related U.S. Application Data

(63) Continuation-in-part of application No. 16/416,309, filed on May 20, 2019, now abandoned.

(51) Int. Cl.
*B26F 1/44* (2006.01)
*B65H 35/00* (2006.01)
*B26F 1/40* (2006.01)

(52) U.S. Cl.
CPC .............. *B26F 1/44* (2013.01); *B26F 1/40* (2013.01); *B65H 35/008* (2013.01); *B26F 2001/4481* (2013.01)

(58) Field of Classification Search
CPC ...... B21D 28/08; B21D 28/02; B65H 35/008; B65H 35/00; B26F 1/40; B26F 2001/4481; G06K 19/022; B26D 7/20
USPC ..... 83/440, 690, 162, 618, 620, 687, 698.91
See application file for complete search history.

(56) References Cited

U.S. PATENT DOCUMENTS 2,489,583 A * 11/1949 Zilda ...................... B21D 28/06
112/155

* cited by examiner

*Primary Examiner* — Nhat Chieu Q Do
(74) *Attorney, Agent, or Firm* — Bajwa IP Law Firm; Harris Zaheer Bajwa (57) ABSTRACT

A separating system for detaching containers from a thermoformed plastic web including a first row of containers. The system includes a stamp plate and a cutting plate. The stamp plate includes a first row of stamps associated with a first set of containers from the first row of containers and a second row of stamps associated with a second set of containers from the first row of containers. The cutting plate includes a first row of cutting openings associated with the first set of containers and a second row of cutting openings associated with the second set of containers.

16 Claims, 9 Drawing Sheets

SEPARATING SYSTEM FOR DETACHING
CONTAINERS FROM A PLASTIC WEB

CROSS-REFERENCE TO RELATED APPLICATION

This application is a continuation-in-part of U.S. patent application Ser. No. 16/416,309, filed May 20, 2019, and entitled "A SEPARATING SYSTEM FOR DETACHING CONTAINERS FROM A PLASTIC WEB" which takes priority from U.S. Provisional Patent Application Ser. No. 62/673,919 filed on May 20, 2018, and entitled "APPARATUS FOR WASTE-FREE CUTTING OF INDIVIDUAL CONTAINERS FROM PLASTIC WEB" which are all incorporated herein by reference in their entirety.

TECHNICAL FIELD

The present disclosure generally relates to industrial packaging and separating machines, and particularly to a separating system for detaching containers from a thermoformed plastic web of containers.

BACKGROUND

In order to package a product, generally by using a thermoforming machine, containers are thermoformed on a plastic web, filled by a product, sealed by a covering foil, and finally, separated from each other by a cutting apparatus. Generally, cutting apparatuses have container-shaped stamps with a similar number and a similar arrangement to those of containers. Cutting apparatuses also have a cutting plate for separating all containers in one cutting cycle of a cutting apparatus. As there may be a space between peripheral edges of adjacent containers, a large amount of plastic waste may be produced during separating containers utilizing these cutting apparatuses. In some cutting apparatuses, only longitudinal strips between straight edges of adjacent containers may be omitted by cutting and star-shaped wastes and transverse strips between adjacent containers may still remain as waste and, consequently, reduction of waste to the highest extent may not be possible.

In some other approaches, a space between containers on a web in both longitudinal and transverse direction may be omitted. Rounded corners of containers are created by die cutting of star-shaped wastes between the containers and straight sides of containers are separated by knives. For every common edge of adjacent containers, one knife may be used. These knives may penetrate through a thickness of a web along common borders to separate containers from each other. In another approach, after cutting star-shaped wastes between rounded corners of containers, instead of separating containers from common borders with knives, containers may be cut alternately with stamps and then may be detached from a plastic web.

On the other hand, in all these approaches, containers are generally separated from each other utilizing several tools and there may be a maladjustment between these tools and, therefore, peripheral edges of the containers may not be smooth. There is, therefore, a need for a separating system to detach containers from a plastic web that reduces waste of a used plastic web as much as possible while providing smooth peripheral edges for containers.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to an exemplary embodiment, the present disclosure describes a separating system for detaching containers from a plastic web of containers. In an exemplary embodiment, the plastic web may include a first row of containers and a second row of containers. In an exemplary embodiment, the first row of containers may include a plurality of containers.

In an exemplary embodiment, the disclosed separating system may include a stamp plate and a cutting plate. In an exemplary embodiment, the stamp plate may include a first row of stamps including a first plurality of stamps and a second row of stamps including a second plurality of stamps. In an exemplary embodiment, the first plurality of stamps may be associated with a first set of containers from the plurality of containers and the second plurality of stamps may be associated with a second set of containers from the plurality of containers.

In an exemplary embodiment, the cutting plate may include a first row of cutting openings including a first plurality of cutting openings and a second row of cutting openings including a second plurality of cutting openings. In an exemplary embodiment, the first plurality of cutting openings may be associated with the first set of containers from the plurality of containers and the second plurality of cutting openings may be associated with the second set of containers from the plurality of containers.

In an exemplary embodiment, the first row of stamps and the first row of cutting openings may be configured to detach the first set of containers from the plastic web through punching the first row of containers between the first row of stamps and the first row of cutting openings responsive to the first row of containers being placed between the first row of stamps and the first row of cutting openings.

In an exemplary embodiment, the second row of stamps and the second row of cutting openings may be configured to detach the second set of containers from the plastic web through punching the first row of containers between the second row of stamps and the second row of cutting openings responsive to the first row of containers being placed between the second row of stamps and the second row of cutting openings.

In an exemplary embodiment, the disclosed separating system may further include a forward intermittent feeding mechanism. In an exemplary embodiment, the forward intermittent feeding mechanism may be configured to place the first row of containers between the first row of stamps and the first row of cutting openings through intermittently feeding of the plastic web between the stamp plate and the cutting plate.

In an exemplary embodiment, the forward intermittent feeding mechanism may further be configured to place the first row of containers between the second row of stamps and the second row of cutting openings by intermittently feeding of the plastic web between the stamp plate and the cutting plate. In an exemplary embodiment, the forward intermittent feeding mechanism may be configured to place the first row of containers between the first row of stamps and the first row of cutting openings and then between the second row of stamps and the second row of cutting openings. In an exemplary embodiment, the first set of containers and the second set of containers may be placed alternately in the first row of containers. In an exemplary embodiment, a number of the first set of containers may be less than a number of the second set of containers by 1.

In an exemplary embodiment, a number of the first plurality of stamps may be equal to a number of the first plurality of cutting openings. In an exemplary embodiment, each respective stamp from the first plurality of stamps may be placed above a respective cutting opening from the first plurality of cutting openings.

In an exemplary embodiment, a number of the second plurality of stamps may be equal to a number of the second plurality of cutting openings. In an exemplary embodiment, each respective stamp from the second plurality of stamps may be placed above a respective cutting opening from the second plurality of cutting openings.

In an exemplary embodiment, each respective cutting opening from the first plurality of cutting openings may include a respective cutting edge corresponding to a peripheral edge of a respective container from the first set of containers. In an exemplary embodiment, the respective cutting edge may be configured to detach the respective container from the first set of containers from the plastic web responsive to the respective row of containers being punched between the first row of stamps and the first row of cutting openings.

In an exemplary embodiment, each respective cutting opening from the second plurality of cutting openings may include a respective cutting edge corresponding to a peripheral edge of a respective container from the second set of containers. In an exemplary embodiment, the respective cutting edge may be configured to detach the respective container from the second set of containers from the plastic web responsive to the respective row of containers being punched between the second row of stamps and the second row of cutting openings.

In an exemplary embodiment, a width of a cutting opening from the second plurality of cutting openings may be larger than a width of a cutting opening from the first plurality of cutting openings by a first amount. In an exemplary embodiment, a length of a cutting opening from the second plurality of cutting openings may be larger than a length of a cutting opening from the first plurality of cutting openings by a second amount. In an exemplary embodiment, the first amount may be two times larger than the second amount.

In an exemplary embodiment, the forward intermittent feeding mechanism, the stamp plate, and the cutting plate may be configured to place the first row of containers between the second row of stamps and the second row of cutting openings and place the second row of containers between the first row of stamps and the first row of cutting openings simultaneously.

In an exemplary embodiment, a first cutting opening from the second plurality of cutting openings may include a first extended edge at a first corner of the first cutting opening. In an exemplary embodiment, the first extended edge may be protruded inwardly from a first cutting edge of the first cutting opening.

In an exemplary embodiment, the forward intermittent feeding mechanism may be configured to place the first row of containers between the second row of stamps and the second row of cutting openings by a forward intermitting movement after the first row of containers being placed between the first row of stamps and the first row of cutting openings.

In an exemplary embodiment, the forward intermittent feeding mechanism may further include a gripping mechanism, an actuator, and one or more processors. In an exemplary embodiment, the gripping mechanism may include an upper two-wheeled mechanism and a lower two-wheeled mechanism.

In an exemplary embodiment, the upper two-wheeled mechanism may include an upper rod, a first wheel, and a second wheel. In an exemplary embodiment, the upper rod may be configured to rotate around an upper axis. In an exemplary embodiment, the first wheel may be mounted fixedly onto the upper rod. In an exemplary embodiment, the second wheel may be mounted fixedly onto the upper rod.

In an exemplary embodiment, the lower two-wheeled mechanism may include a lower rod, a third wheel, and a fourth wheel. In an exemplary embodiment, the lower rod may be configured to rotate around a lower axis. In an exemplary embodiment, the third wheel may be mounted fixedly onto the lower rod. In an exemplary embodiment, the fourth wheel may be mounted fixedly onto the lower rod.

In an exemplary embodiment, the actuator may be coupled to the lower rod. In an exemplary embodiment, the actuator may be configured to rotate the lower rod around the lower axis. In an exemplary embodiment, the one or more processors may be connected to the actuator. In an exemplary embodiment, the one or more processors may be configured to control movements of the actuator.

In an exemplary embodiment, the gripping mechanism may be configured to grip the plastic web between the upper two-wheeled mechanism and the lower two-wheeled mechanism. In an exemplary embodiment, the third wheel and the fourth wheel may be configured to urge the plastic web to move in a first direction responsive to rotation of the lower rod around the lower axis and in a first rotational direction

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

In an aspect, an exemplary system for separating containers from a thermoformed plastic web of containers is disclosed. The exemplary system may comprise of two stages of stamps. Some of the containers may be cut in a first stage of the two stages of stamps and remaining containers may be cut in a second stage of the two stages of stamps. For example, in a case that there are five containers in each row of the thermoformed plastic web, two of the containers may be cut in the first stage of the two stages of stamps. Then, the thermoformed plastic web may be moved to another forward position where three remaining un-cut containers in a semi-punched row may reach to the second stage of the two stages of stamps. In the second state, in another cutting cycle, remaining attachments of these containers may be detached and individual containers may be obtained. Specifically, utilizing the exemplary system may aid in reducing waste of a thermoformed plastic web during a process of separating containers from a thermoformed plastic web while providing fairly smooth peripheral edges of detached individual containers.

Figure 1A:
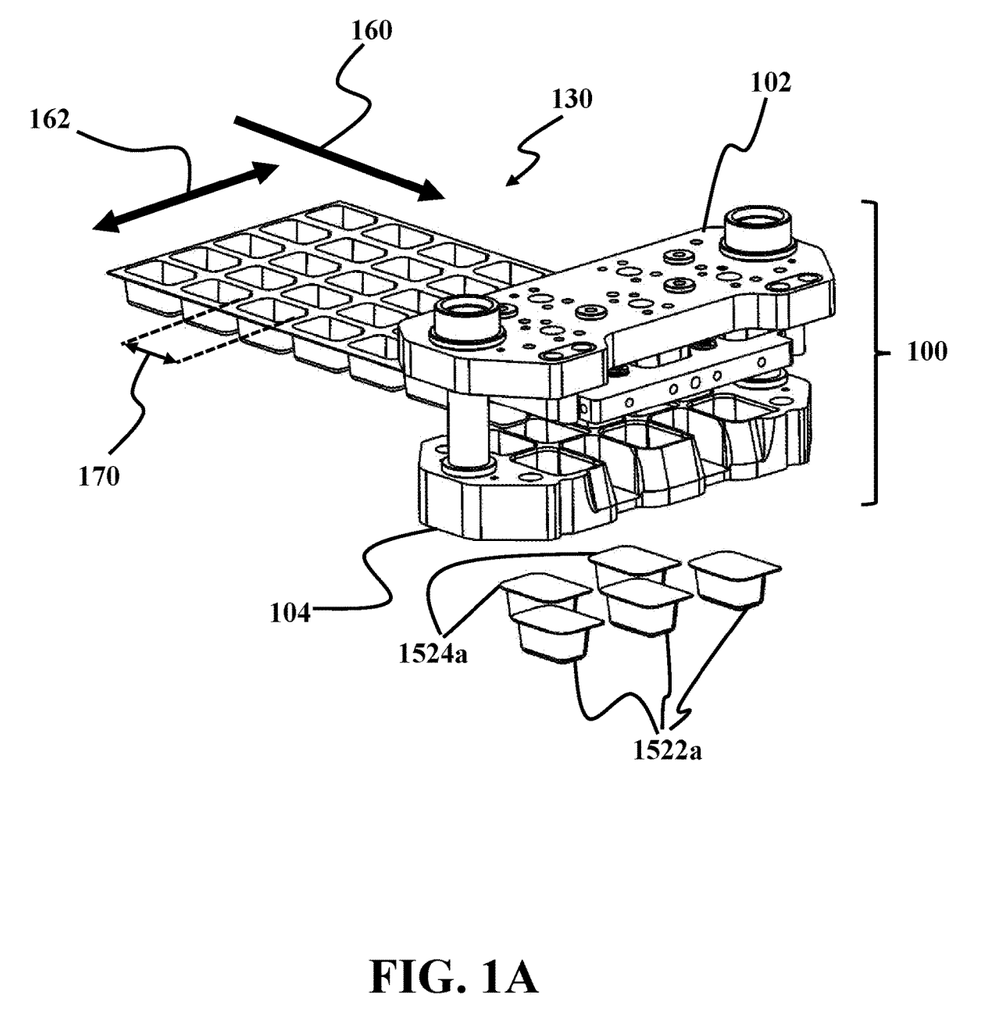
FIG. 1A illustrates an exemplary separating system for detaching containers from a plastic web, consistent with one or more exemplary embodiments of the present disclosure.
Figure 1B:
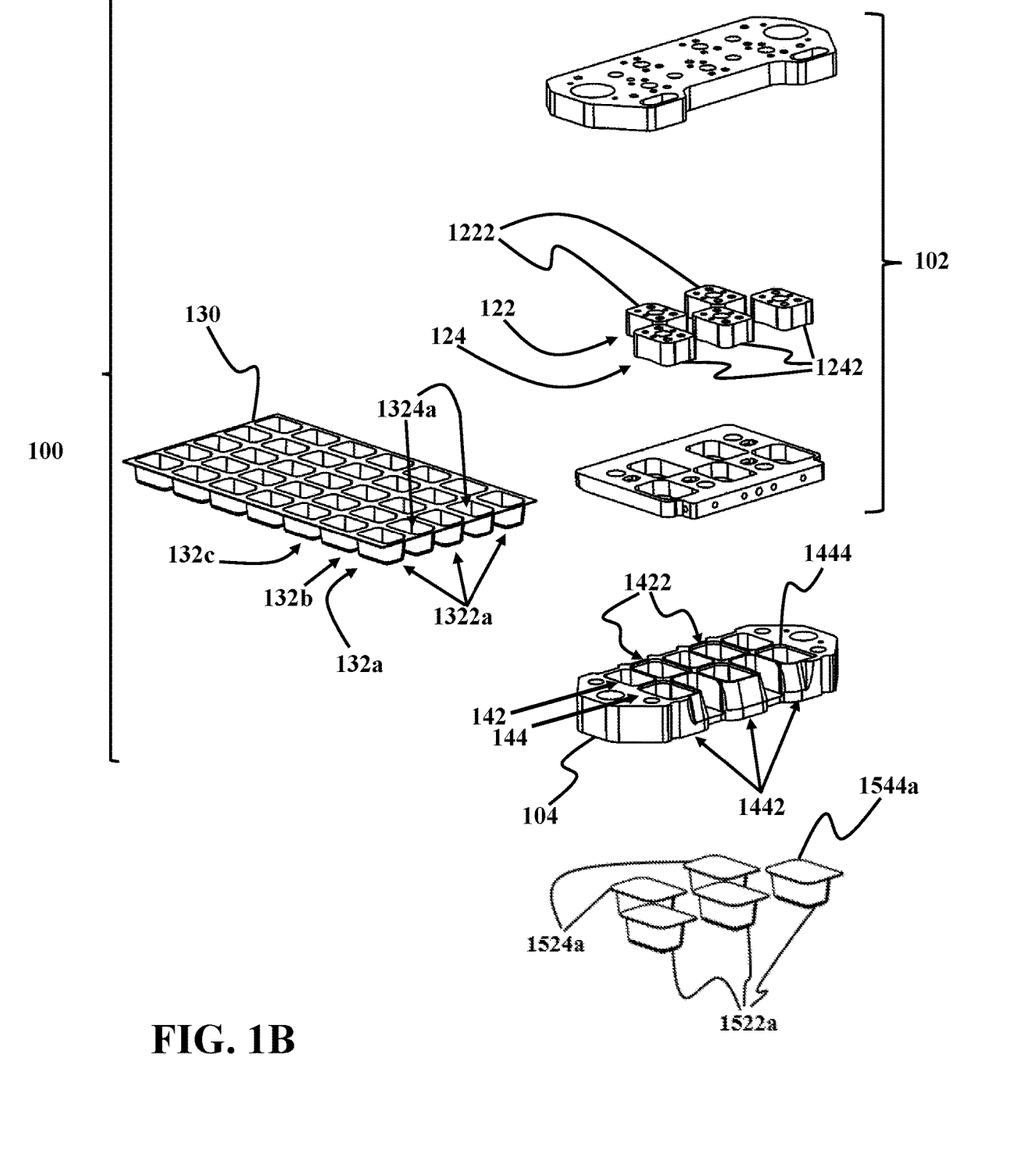
FIG. 1B illustrates an exploded view of an exemplary separating system for detaching containers from a plastic web, consistent with one or more exemplary embodiments of the present disclosure.

FIG. 1A shows an exemplary separating system for detaching containers from a plastic web, consistent with one or more exemplary embodiments of the present disclosure. FIG. 1B shows an exploded view of an exemplary separating system for detaching containers from a plastic web, consistent with one or more exemplary embodiments of the present disclosure. As shown in FIG. 1A and FIG. 1B, in an exemplary embodiment, an exemplary separating system 100 may include a stamp plate 102 and a cutting plate 104. In an exemplary embodiment, stamp plate 102 may include a first row of stamps 122 (obscured from view in FIG. 1A but shown in FIG. 1B) and a second row of stamps 124 (obscured from view in FIG. 1A but shown in FIG. 1B). In an exemplary embodiment, first row of stamps 122 may include a first plurality of stamps 1222. In an exemplary embodiment, second row of stamps 124 may include a second plurality of stamps 1242.

As shown in FIG. 1B, in an exemplary embodiment, plastic web 130 may include a plurality of rows of containers including a first row of containers 132a, a second row of containers 132b, and a third row of containers 132c. In an exemplary embodiment, each respective row from the plurality of rows of containers may include a respective first set of containers and a respective second set of containers. It may be understood that, in an exemplary embodiment, the respective first set of containers and the respective second set of containers may be placed alternately in the respective row. For example, as shown in FIG. 1B, first row of containers 132a may include a first set of containers 1324a and a second set of containers 1322a. In an exemplary embodiment, first set of containers 1324a and second set of containers 1322a may be aligned in a straight row in a traverse feeding direction 162. In an exemplary embodiment, all containers of first set of containers 1324a and second set of containers 1322a may have a same shape, a same size, and a same depth. As may be clear from FIG. 1A and FIG. 1B, in an exemplary embodiment, it may be understood that, first detached set of containers 1524a may refer to first set of containers 1324a after that they are detached from plastic web 130. Similarly, in an exemplary embodiment, second detached set of containers 1522a may refer to second set of containers 1322a after that they are detached from plastic web 130. In an exemplary embodiment, as shown in FIG. 1B, each row from the plurality of rows of containers may include five respective containers. In this case, first set of containers 1324a may include two containers and second set of containers 1322a may include three containers. As shown in FIG. 1B, in an exemplary embodiment, first set of containers 1324a and second set of containers 1322a may be placed alternately in first row of containers 132a. It may be understood that, in an exemplary embodiment, each row from plurality of rows of containers may include any numbers of containers.

With further reference to FIG. 1A and FIG. 1B, in an exemplary embodiment, first plurality of stamps 1222 may be associated with first set of containers 1324a. In an exemplary embodiment, a number of first plurality of stamps 1222 may be equal to a number of first set of containers 1324a. In an exemplary embodiment, second plurality of stamps 1242 may be associated with second set of containers 1322a. In an exemplary embodiment, a number of second plurality of stamps 1242 may be equal to a number of second set of containers 1322a. In other words, in an exemplary embodiment, first plurality of stamps 1222 and second plurality of stamps 1242 may be associated with alternating containers in first row of containers 132a. In an exemplary embodiment, first plurality of stamps 1222 may be configured to detach first set of containers 1324a from plastic web 130. In an exemplary embodiment, second plurality of stamps 1242 may be configured to detach second set of containers 1322a from plastic web 130.

With further reference to FIG. 1A and FIG. 1B, in an exemplary embodiment, cutting plate 104 may include a first row of cutting openings 142 and a second row of cutting openings 144. In an exemplary embodiment, first row of cutting openings 142 may include a first plurality of cutting openings 1422 associated with first set of containers 1324a. In an exemplary embodiment, a number of first plurality of cutting openings 1422 may be equal to a number of first set of containers 1324a. In an exemplary embodiment, as shown in FIG. 1B, both the number of first plurality of cutting openings 1422 and the number of first plurality of stamps 1222 may be equal to two. In an exemplary embodiment, each respective stamp from first plurality of stamps 1222 may be placed above a respective cutting opening from first plurality of cutting openings 1242. In an exemplary embodiment, first plurality of stamps 1222 and first plurality of cutting openings 1242 may be configured to detach first set of containers 1324a from plastic web 130 when first row of containers 132a is placed between first plurality of stamps 1222 and first plurality of cutting openings 1242.

In an exemplary embodiment, second row of cutting openings 144 may include a second plurality of cutting openings 1442 associated with second set of containers 1322a. In an exemplary embodiment, a number of second plurality of cutting openings 1442 may be equal to a number of second plurality of stamps 1242. In an exemplary embodiment, as shown in FIG. 1B, both the number of second plurality of cutting openings 1442 and the number of second plurality of stamps 1242 may be equal to three. In an exemplary embodiment, each respective stamp from second plurality of stamps 1242 may be placed above a respective cutting opening from second plurality of cutting openings 1442. In an exemplary embodiment, second plurality of stamps 1242 and second plurality of cutting openings 1442 may be configured to detach second set of containers 1322a from plastic web 130 through punching first row of containers 132a between second plurality of stamps 1242 and second plurality of cutting openings 1442.

Figure 1C:
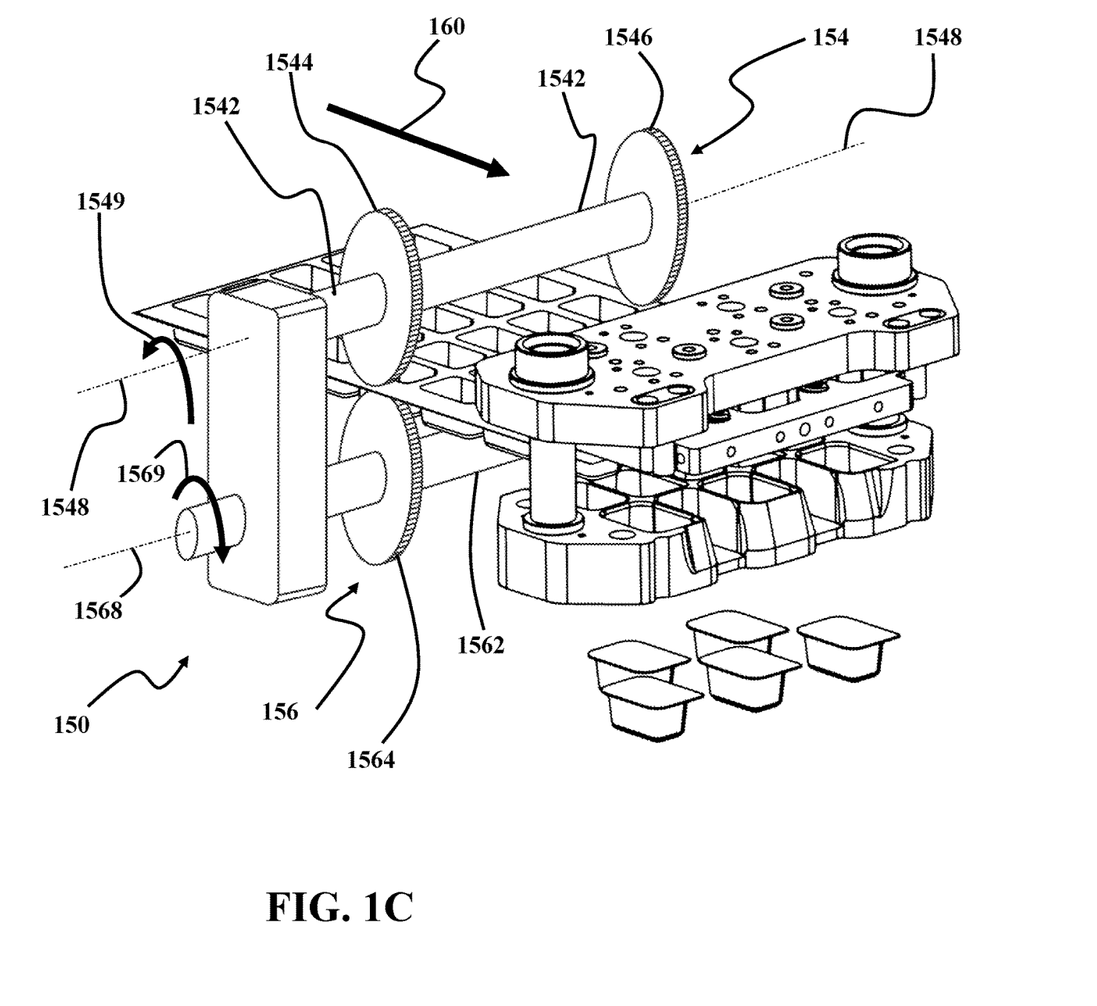
FIG. 1C illustrates an exemplary separating system for detaching containers from a plastic web, consistent with one or more exemplary embodiments of the present disclosure.
Figure 1D:
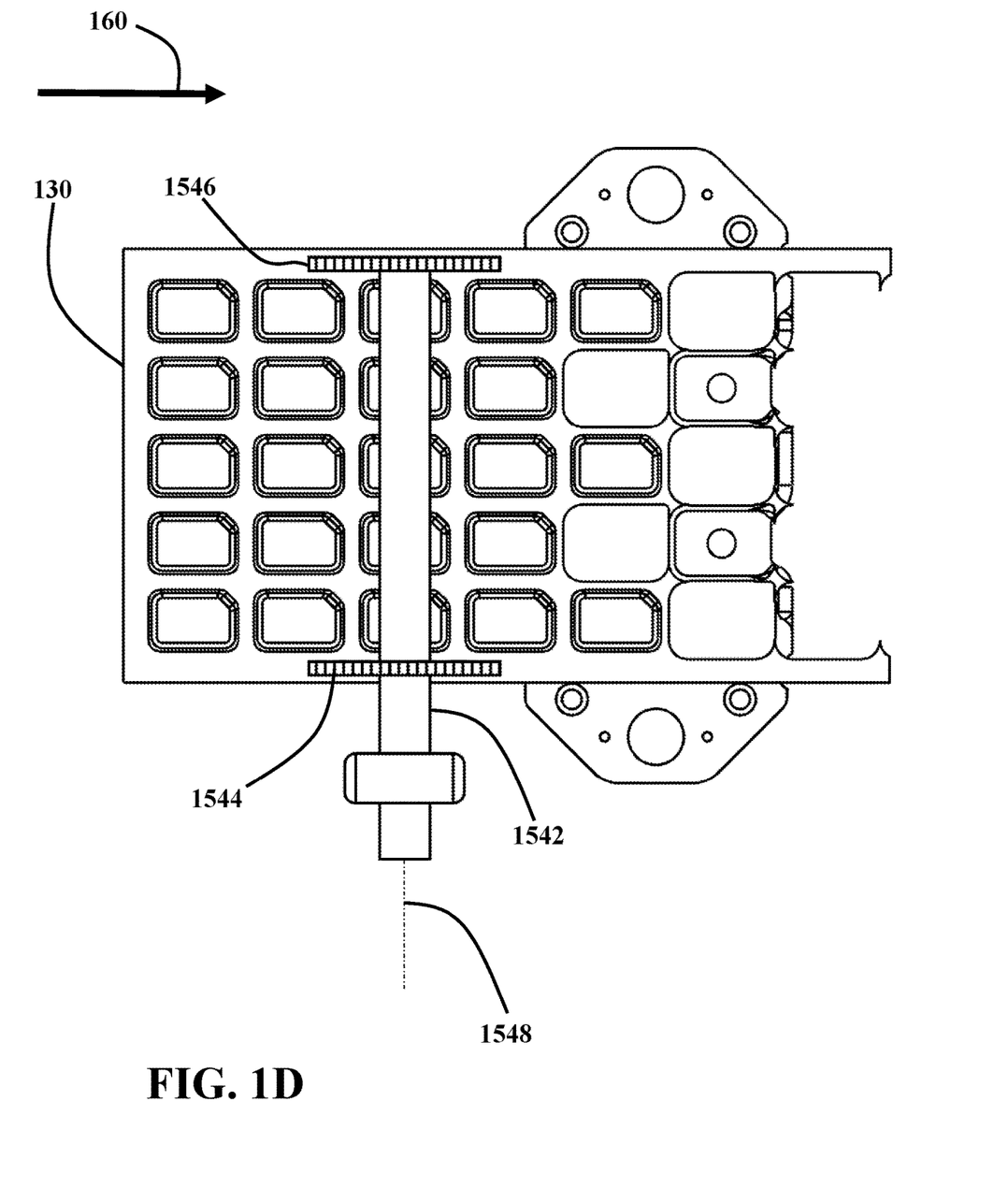
FIG. 1D illustrates a top view of an exemplary separating system for detaching containers from a plastic web, consistent with one or more exemplary embodiments of the present disclosure.

FIG. 1C shows an exemplary separating system for detaching containers from a plastic web, consistent with one or more exemplary embodiments of the present disclosure. FIG. 1D shows a top view of an exemplary separating system for detaching containers from a plastic web, consistent with one or more exemplary embodiments of the present disclosure. As shown in FIG. 1C, in an exemplary embodiment, separating system 100 may further include a forward intermittent feeding mechanism 150. In an exemplary embodiment, forward intermittent feeding mechanism 150 may be configured to place first row of containers 132a between first row of stamps 122 and first row of cutting openings 142 by moving plastic web 130 in first direction 160. In an exemplary embodiment, forward intermittent mechanism 150 may be configured to intermittently feed each row of plurality of rows of containers between stamp plate 102 and cutting plate 104. As shown in FIG. 1C, in an exemplary embodiment, forward intermittent feeding mechanism 150 may be configured to move plastic web 130 in direction 160 in order to intermittently feed each row of plurality of rows of containers between stamp plate 102 and cutting plate 104. In an exemplary embodiment, forward intermittent feeding mechanism 150 may be configured to place first row of containers 132a between first row of stamps 122 and first row of cutting openings 142.

As shown in FIG. 1C, in an exemplary embodiment, forward intermittent feeding mechanism 150 may include a gripping mechanism. In an exemplary embodiment, the gripping mechanism may include an upper two-wheeled mechanism 154 and a lower two-wheeled mechanism 156. In an exemplary embodiment, plastic web 130 may be disposed and gripped between upper two-wheeled mechanism 154 and lower two-wheeled mechanism 156. In an exemplary embodiment, upper two-wheeled mechanism 154 may include an upper rod 1542, a first wheel 1544, and a second wheel 1546. In an exemplary embodiment, first wheel 1544 and second wheel 1546 may be mounted fixedly onto upper rod 1542. In an exemplary embodiment, when a wheel, for example first wheel 1544 and/or second wheel 1546, is mounted fixedly onto upper rod 1542, it may mean that the wheel is mounted onto upper rod 1542 in such a way that any relative movement between upper rod 1542 and the wheel is prevented. In an exemplary embodiment, when upper rod 1542 rotates around an upper axis 1548, first wheel 1544 and second wheel 1546 may rotate synchronously with upper rod 1542 around upper axis 1548. In an exemplary embodiment, upper axis 1548 may be the same as the main longitudinal axis of upper rod 1542. In an exemplary embodiment, upper axis 1548 may be parallel to lower axis 1568.

In an exemplary embodiment, lower two-wheeled mechanism 156 may include a lower rod 1562, a third wheel 1564, and a fourth wheel (obscured from view in FIG. 1C). In an exemplary embodiment, third wheel 1564 and the fourth wheel may be mounted fixedly onto lower rod 1562. In an exemplary embodiment, when a wheel, for example third wheel 1564 and/or the fourth wheel, is mounted fixedly onto lower rod 1562, it may mean that the wheel is mounted onto lower rod 1562 in such a way that any relative movement between lower rod 1562 and the wheel is prevented. In an exemplary embodiment, when lower rod 1562 rotates around a lower axis 1568, third wheel 1564 and the fourth wheel may rotate synchronously with lower rod 1562 around lower axis 1568. In an exemplary embodiment, lower axis 1568 may be the same as the main longitudinal axis of lower rod 1562. In an exemplary embodiment, upper axis 1548 may be parallel to lower axis 1568. In an exemplary embodiment, plastic web 130 may be disposed and gripped between upper two-wheeled mechanism 154 and lower two-wheeled mechanism 156 in such a way that first wheel 1544 is placed above third wheel 1564 and also second wheel 1546 is placed above the fourth wheel.

In an exemplary embodiment, forward intermittent feeding mechanism 150 may further include one or more processors and an actuator. In an exemplary embodiment, lower rod 1562 may be coupled to the actuator. In an exemplary embodiment, the actuator may be configured to rotate lower rod 1562 around lower axis 1568. In an exemplary embodiment, when lower rod 1562 rotates around lower axis 1568 and in a first rotational direction 1569, plastic web 1369 may move in direction 160. In an exemplary embodiment, first rotational direction 1569 may include a clockwise rotational direction. In an exemplary embodiment, when lower rod 1562 rotates around lower axis 1568 and in first rotational direction 1569, third wheel 1564 and the fourth wheel may rotate synchronously with lower rod 1562 around lower axis 1568. In an exemplary embodiment, when third wheel 1564 and the fourth wheel rotate around lower axis 1568 and in first rotational direction 1569, a friction force between third wheel 1564 and the fourth wheel, and plastic web 130 may urge plastic web 130 to move in direction 160.

In an exemplary embodiment, when plastic web 130 moves in direction 160, a friction force between first wheel 1544 and second wheel 1546, and plastic web 130 may urge first wheel 1544 and second wheel 1546 to rotate around upper axis 1548 and in a second rotational direction 1549. In an exemplary embodiment, second rotational direction may be opposite to first rotational direction 1569. In an exemplary embodiment, second rotational direction may include a counterclockwise direction. In an exemplary embodiment, the actuator may be connected to the one or more processors. The one or more processors may be configured to control movements of the actuator. In one or more exemplary embodiments, the one or more processors may urge movement of the actuator by providing instructions and/or signals to the actuator, which may be understood in further details in context of processing unit 400 which is described in FIG. 4.

In an exemplary embodiment, the one or more processors may urge lower rod 1562 to rotate around lower axis 1568 and in first rotational direction 1569 by a predetermined amount, for example 180 degrees. In an exemplary embodiment, when lower rod 1562 rotates around lower axis 1568 and in first rotational direction 1569 by a predetermined amount, plastic web 130 may move in direction 160 in such a way that next row of plurality of rows of containers is placed between stamp plate 102 and cutting plate 104. In an exemplary embodiment, a distance 170 may be defined between two consecutive rows of plurality of rows of containers. In an exemplary embodiment, when lower rod 1562 rotates around lower axis 1568 and in first rotational direction 1569 by a predetermined amount, plastic web 130 may move in direction 160 by amount of distance 170. In an exemplary embodiment, when first row of containers 132*a* is placed between first row of stamps 122 and first row of cutting openings 142, stamp plate 102 may be pressed onto cutting plate 104. In an exemplary embodiment, responsive to stamp plate 102 being pressed onto cutting plate 104, first row of containers 132*a* may be punched between first row of stamps 122 and first row of cutting openings 142 and first set of containers 1324*a* may be detached from plastic web 130 and detached plurality of even-numbered containers 1524*a* may be obtained. Then, plastic web 130 may move in direction 160 by amount of distance 170 so that first row of containers 132*a* is placed between second row of stamps 124 and second row of cutting openings 144. Then, the one or more processors may send a command to an actuator of stamp plate 102 to press stamp plate 102 onto cutting plate 104. In one or more exemplary embodiments, the one or more processors may urge press stamp plate 102 pressing by providing instructions or signals to stamp plate 102, which may be understood in further details in context of processing unit 400 which is described in FIG. 4.

In an exemplary embodiment, when first row of containers 132*a* is placed between first row of stamps 122 and first row of cutting openings 142, stamp plate 102 may be pressed onto cutting plate 104. In an exemplary embodiment, responsive to stamp plate 102 being pressed onto cutting plate 104, first row of containers 132*a* may be punched between first row of stamps 122 and first row of cutting openings 142 and first set of containers 1324*a* may be detached from plastic web 130 and detached plurality of even-numbered containers 1524*a* may be obtained. In an exemplary embodiment, each respective cutting opening from first plurality of cutting openings 1422 and second plurality of cutting openings 1442 may include a respective cutting edge. In an exemplary embodiment, the respective cutting edge may be configured to detach the respective container from plastic web 130 when a respective row of containers is punched between stamp plate 102 and cutting plate 104. In an exemplary embodiment, the respective cutting edge may correspond to a peripheral edge of a respective container. For example, in an exemplary embodiment, one of second plurality of cutting openings 1442 may include a cutting edge 1444. In an exemplary embodiment, cutting edge 1444 may correspond to a peripheral edge 1544*a* of one of second detached set of containers 1522*a*.

Figure 2A:
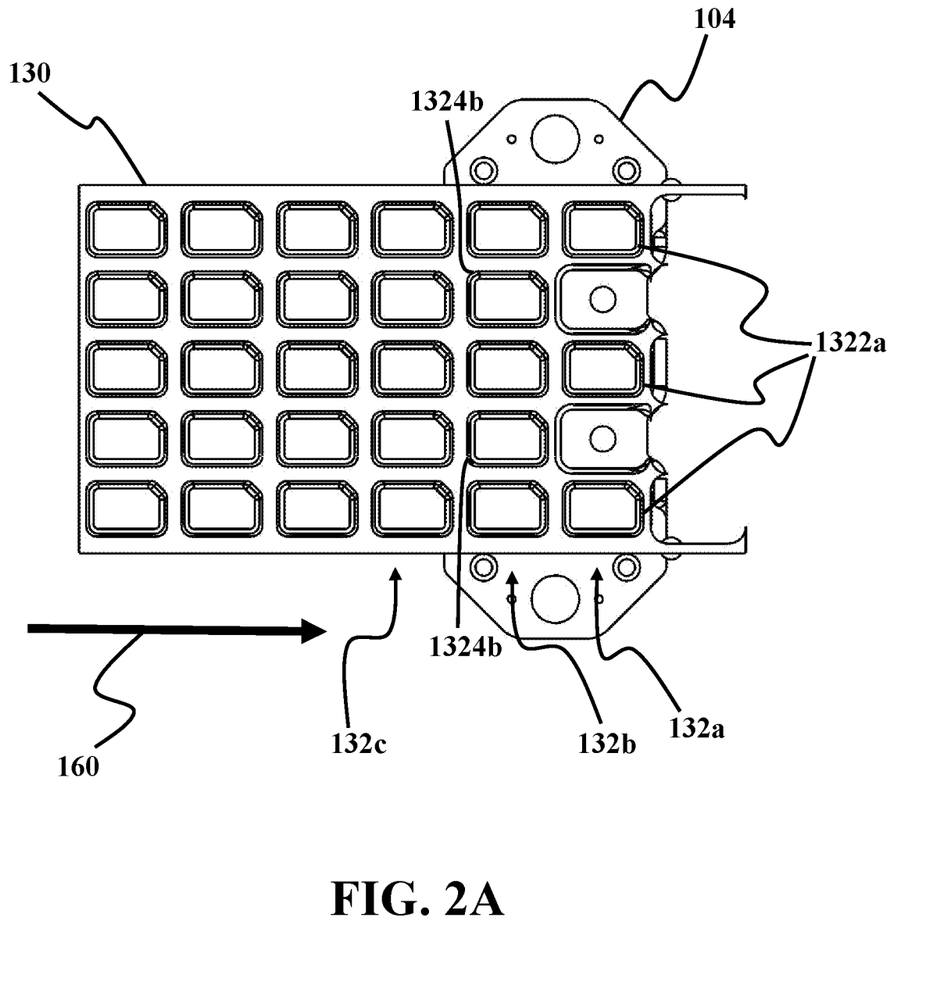
FIG. 2A illustrates an exemplary scenario in which an exemplary plastic web with a first row of containers being placed between a second row of stamps and a second row of cutting openings, consistent with one or more exemplary embodiments of the present disclosure.

Then, in an exemplary embodiment, forward intermittent feeding mechanism 150 may move plastic web 130 to another forward position in direction 160 in order to place first row of containers 132*a* between second row of stamps 124 and second row of cutting openings 144. FIG. 2A shows an exemplary scenario in which an exemplary plastic web with a first row of containers being placed between a second row of stamps and a second row of cutting openings, consistent with one or more exemplary embodiments of the present disclosure. As shown in FIG. 2A, after that first set of containers 1324*a* are detached from plastic web 130, first row of containers 132*a* may be moved forward in direction 160, utilizing forward intermittent feeding mechanism 150 to be placed between second row of stamps 124 and second row of cutting openings 144.

In an exemplary embodiment, when first row of containers 132*a* is placed between second row of stamps 124 and second row of cutting openings 144, stamp plate 102 may be pressed onto cutting plate 104. In an exemplary embodiment, responsive to stamp plate 102 being pressed onto cutting plate 104, second row of stamps 124 and second row of cutting openings 144 may punch first row of containers 132*a* between second row of stamps 124 and second row of cutting openings 144 and detach second set of containers 1322*a* from plastic web 130. Consequently, in an exemplary embodiment, second detached set of containers 1522*a* may be obtained.

Figure 2B:
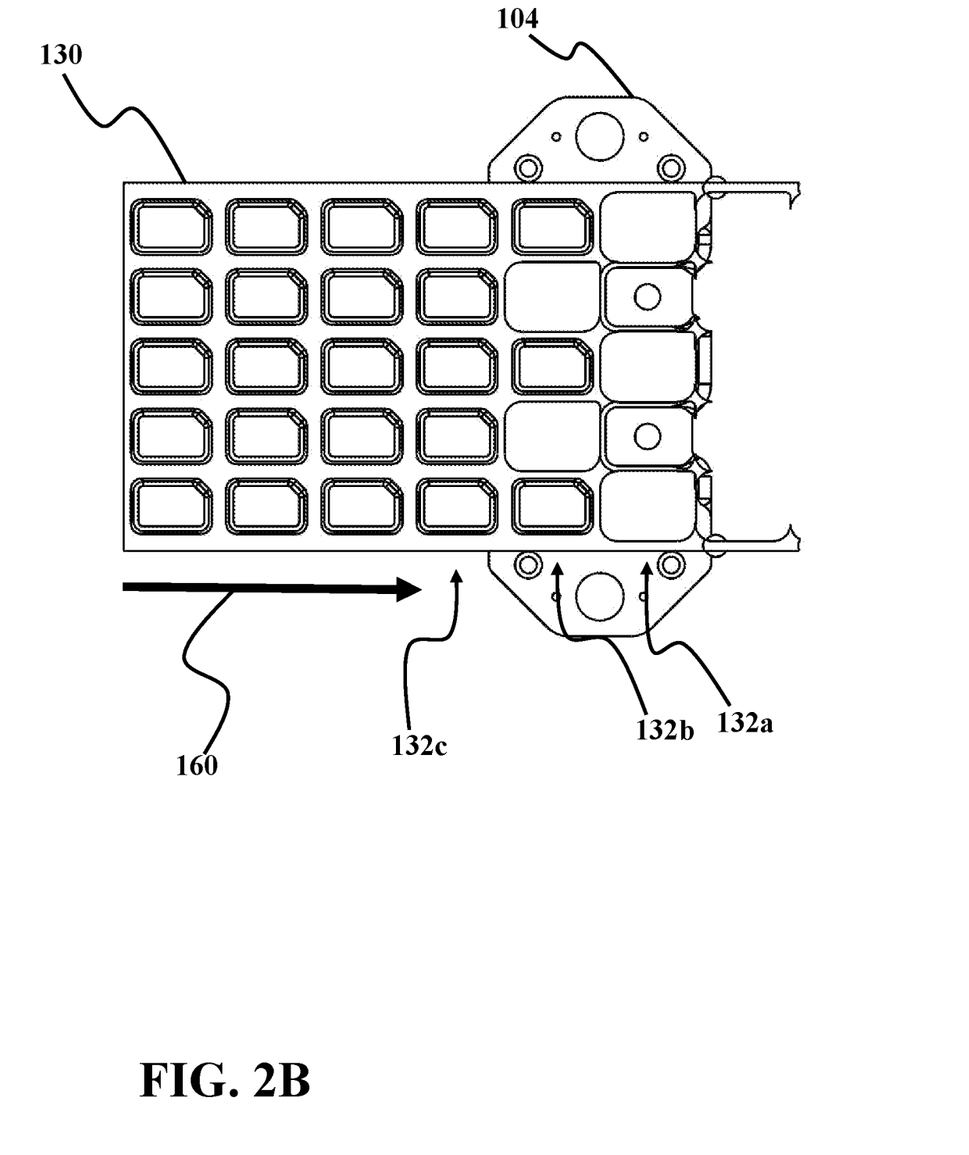
FIG. 2B illustrates an exemplary scenario in which an exemplary plastic web with a first row of containers being punched between a second row of stamps and a second row of cutting openings and with a second row of containers being punched between a first row of stamps and a first row of cutting openings, consistent with one or more exemplary embodiments of the present disclosure.

As may be seen in FIG. 2A, in an exemplary embodiment, stamp plate 102 and cutting plate 104 may be designed in a way such that when first row of containers 132*a* is placed between second row of stamps 124 and second row of cutting openings 144, second row of containers 132*b* may be placed between first row of stamps 122 and first row of cutting openings 142 simultaneously. In an exemplary embodiment, when stamp plate 102 is pressed onto cutting plate 104 in order to punch first row of containers 132*a* between second row of stamps 124 and second row of cutting openings 144, second row of containers 132*b* may be punched between first row of stamps 122 and first row of cutting openings 142. Hence, when second set of containers 1322*a* are detached from plastic web 130 and second detached set of containers 1522*a* are obtained, third set of containers 1324*b* (shown in FIG. 2A) may be detached from plastic web 130 and third detached set of containers may be obtained simultaneously. FIG. 2B shows an exemplary scenario in which an exemplary plastic web with a first row of containers being punched between a second row of stamps and a second row of cutting openings and with a second row of containers being punched between a first row of stamps and a first row of cutting openings, consistent with one or more exemplary embodiments of the present disclosure.

Figure 3A:
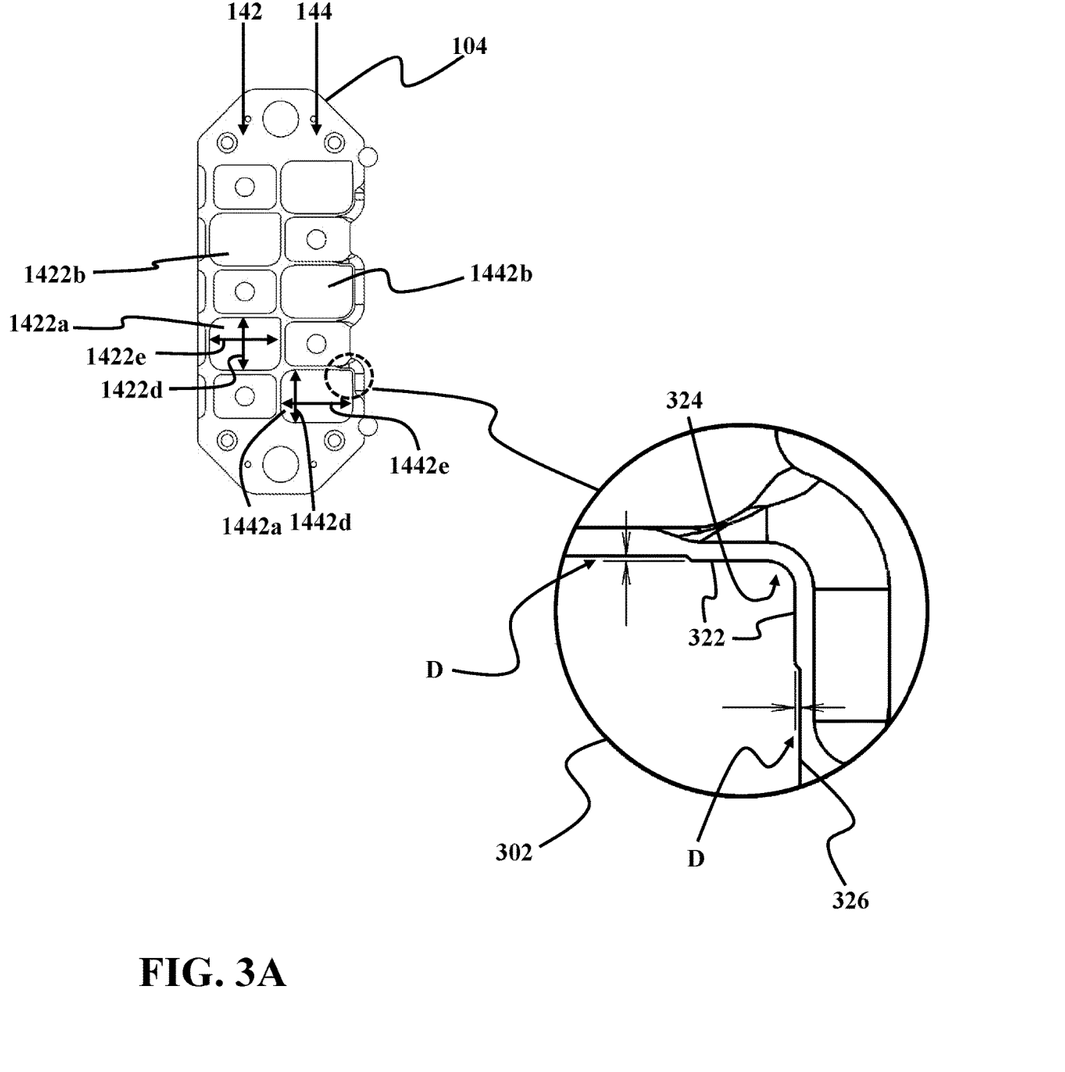
FIG. 3A illustrates a top view of an exemplary cutting plate utilized in a separating system, consistent with one or more exemplary embodiments of the present disclosure.

FIG. 3A shows a top view of an exemplary cutting plate utilized in a separating system, consistent with one or more exemplary embodiments of the present disclosure. As shown in FIG. 3A, in an exemplary embodiment, a second width 1442*d* of a first cutting opening 1442*a* from second plurality of cutting openings 1442 may be larger than a first width 1422*d* of a second cutting opening 1422*a* from first plurality of cutting openings 1422 by amount of distance 2D. In an exemplary embodiment, a second length 1442*e* of first cutting opening 1442*a* may be larger than a first length 1422*e* of second cutting opening 1422*a* by amount of distance D.

In an exemplary embodiment, each respective cutting opening from second plurality of cutting openings 1442 may include a respective extended edge at a respective corner of the respective cutting opening. For example, as shown in detailed view 302 of FIG. 3A, in an exemplary embodiment, first cutting opening 1442a from second plurality of cutting openings 1442 may include a first extended edge 322 at a first corner 324 of first cutting opening 1442a. In an exemplary embodiment, first extended edge 322 may be protruded inwardly by an amount of distance D from a first cutting edge 326 of first cutting opening 1442a.

Figure 3B:
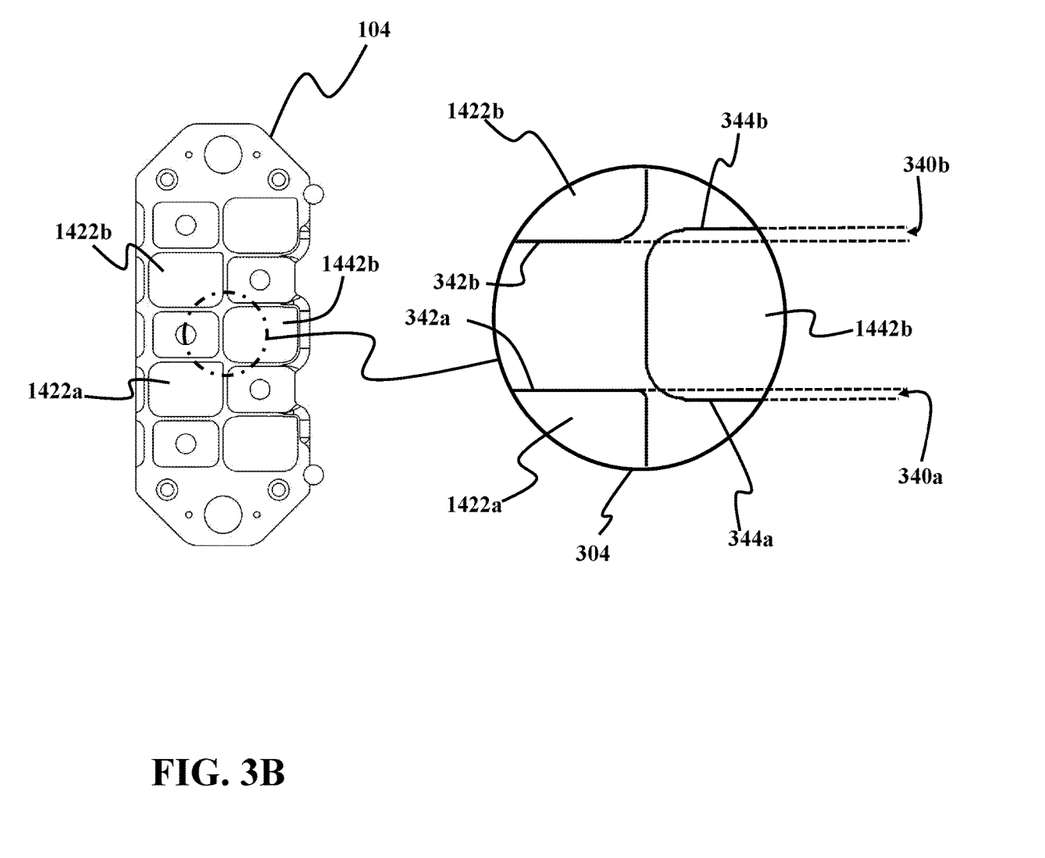
FIG. 3B illustrates a top view of an exemplary cutting plate utilized in a separating system, consistent with one or more exemplary embodiments of the present disclosure.

FIG. 3B shows a top view of an exemplary cutting plate utilized in a separating system, consistent with one or more exemplary embodiments of the present disclosure. As shown in detailed view 304 of FIG. 3B, in an exemplary embodiment, a third top side 344b of a third cutting opening 1442b from second plurality of cutting openings 1442 may not be aligned with a fourth bottom side 342b of a fourth cutting opening 1422b from first plurality of cutting openings 1422. In an exemplary embodiment, there may be a top offset 340b between third top side 344b and fourth bottom side 342b. In an exemplary embodiment, top offset 340b may be equal to amount of distance D.

As further shown in FIG. 3B, in an exemplary embodiment, a third bottom side 344a of third cutting opening 1442b may not be aligned with a second top side 342a of second cutting opening 1422a. In an exemplary embodiment, there may be a bottom offset 340a between third bottom side 344a and second top side 342a. In an exemplary embodiment, bottom offset 340a may be equal to amount of distance D It may be understood that, in an exemplary embodiment, benefits from providing first extended edge 322 at first corner 324 may include, but not limited to, eliminating or otherwise minimizing narrow strip-shaped waste that may be produced due to an inexact positioning of plastic web 130 between stamp plate 102 and cutting plate 104. Hence, it may be understood that, by utilizing disclosed separating system, wastage of plastic web 130 may be minimized while peripheral edges of first detached set of containers 1524a and second detached set of containers 1522a may be smooth as they are cut with a considerable wastage in plastic web and, therefore, economical containers production may not lead to a bad appearance of containers.

Figure 4:
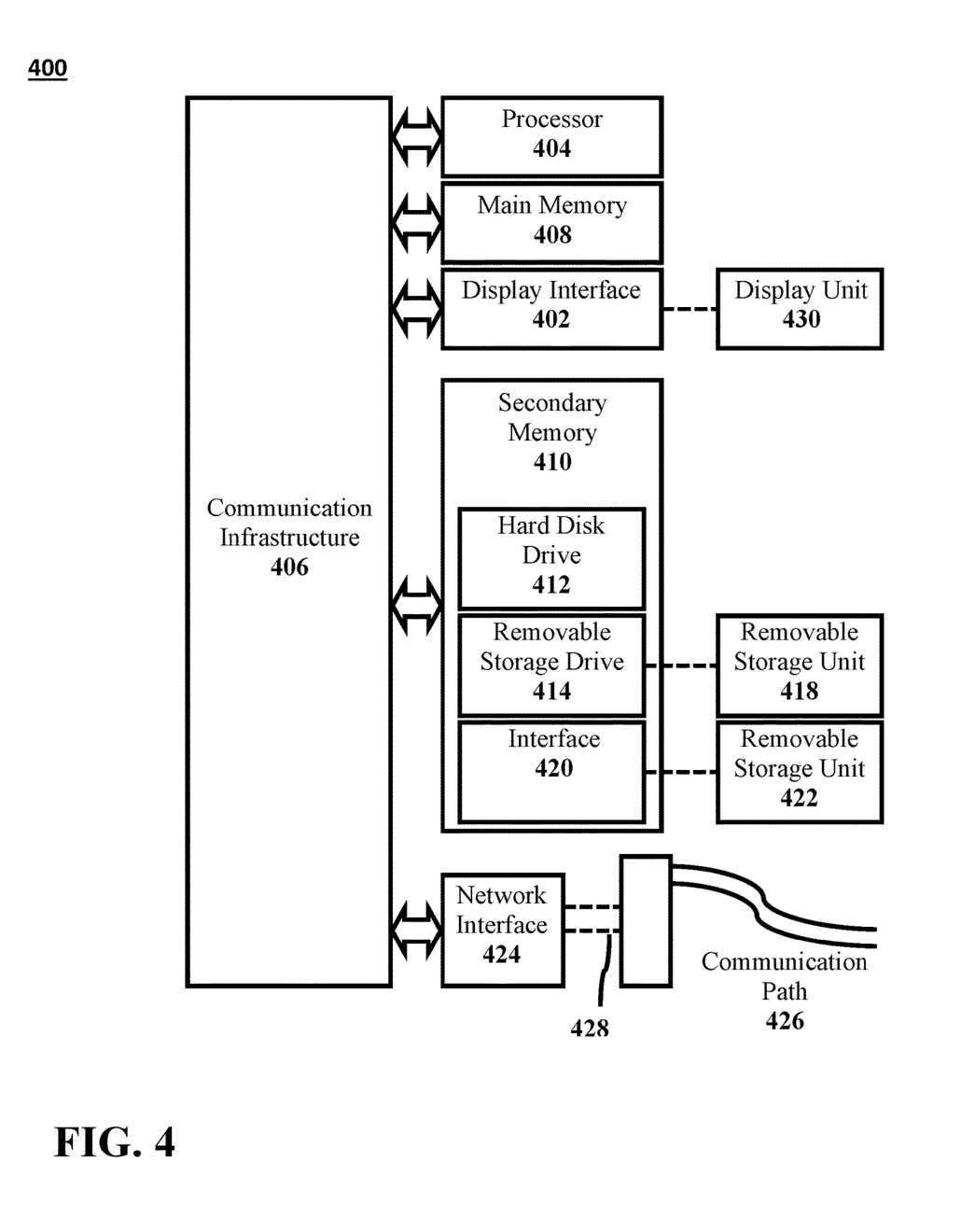
FIG. 4 illustrates an exemplary embodiment of a processing unit in which an exemplary embodiment of the present disclosure, or portions thereof, may be implemented as computer-readable code, consistent with one or more exemplary embodiments of the present disclosure.

FIG. 4 shows an exemplary embodiment of processing unit 400 in which an exemplary embodiment of the present disclosure, or portions thereof, may be implemented as computer-readable code, consistent with one or more exemplary embodiments of the present disclosure. For example, an exemplary forward intermittent feeding mechanism, including the one or more processors, may be implemented in processing unit 400 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that an exemplary embodiment of the disclosed subject matter can be practiced with various computer system configurations, including multi-core multiprocessor systems, minicomputers, mainframe computers, computers linked or clustered with distributed functions, as well as microcontrollers, pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An exemplary embodiment of the present disclosure is described in terms of this example processing unit 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general-purpose processor device. As will be appreciated by persons skilled in the relevant art, processor device 404 may also be a single processor in a multi-core/multiprocessor system, such system operating alone, or in a cluster of computing devices operating in a cluster or server farm. In an exemplary embodiment, processor device 404 may be connected to a communication infrastructure 406, for example, a bus, message queue, network, or multi-core message-passing scheme.

In an exemplary embodiment, processing unit 400 may also include a main memory 408, for example, random access memory (RAM), and may also include a secondary memory 410. In an exemplary embodiment, secondary memory 410 may include a hard disk drive 412, and a removable storage drive 414. In an exemplary embodiment, removable storage drive 414 may include a floppy disk drive, a magnetic tape drive, an optical disk drive, a flash memory, or the like. In addition, removable storage drive 414 may read from and/or write to a removable storage unit 418 in a well-known manner. In an exemplary embodiment, removable storage unit 418 may include a floppy disk, magnetic tape, optical disk, etc., which may be read by and written to by removable storage drive 414. As will be appreciated by persons skilled in the relevant art, removable storage unit 418 may include a computer usable storage medium having stored therein computer software and/or data.

In alternative implementations, secondary memory 410 may include other similar means for allowing computer programs or other instructions to be loaded into one or more processors 105. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to processing unit 400.

In an exemplary embodiment, processing unit 400 may also include a communications interface 424. Communications interface 424 may allow software and data to be transferred between processing unit 400 and external devices. In an exemplary embodiment, communications interface 424 may include a modem, a network interface (such as an Ethernet card), a communications port, a PCM-CIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. In an exemplary embodiment, communications path 426 may carry signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

In some exemplary embodiment, computer programs (also called computer control logic) may be stored in main memory 408 and/or secondary memory 410. Computer programs may also be received via communications interface 424. Such computer programs, when executed, enable processing unit 400 to implement the present disclosure as discussed herein. In particular, the computer programs, when executed, may enable processor device 404 to implement the processes of the present disclosure. Accordingly, such computer programs represent controllers of processing unit 400. Where the present disclosure is implemented using software, the software may be stored in a computer program product and loaded into processing unit 400 using removable storage drive 414, interface 420, and hard disk drive 412, or communications interface 424.

Embodiments of the present disclosure may also be directed to computer program products including software stored on any computer useable medium. Such software, when executed in one or more data processing devices, causes a data processing device(s) to operate as described herein. An exemplary embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or shown is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A separating system for detaching containers from a plastic web, the plastic web comprising a first row of containers and a second row of containers, the first row of containers comprising a plurality of containers, the separating system comprising:

a stamp plate, comprising:
- a first row of stamps comprising a first plurality of stamps, the first plurality of stamps being associated with a first set of containers from the plurality of containers; and
- a second row of stamps comprising a second plurality of stamps, the second plurality of stamps being associated with a second set of containers from the plurality of containers; and a cutting plate, comprising:
- a first row of cutting openings comprising a first plurality of cutting openings, the first plurality of cutting openings being associated with the first set of containers; and
- a second row of cutting openings comprising a second plurality of cutting openings, the second plurality of cutting openings being associated with the second set of containers; wherein:
- the first row of stamps and the first row of cutting openings are configured to detach the first set of containers from the plastic web through punching the first row of containers between the first row of stamps and the first row of cutting openings responsive to the first row of containers being placed between the first row of stamps and the first row of cutting openings;
- the second row of stamps and the second row of cutting openings are configured to detach the second set of containers from the plastic web through punching the first row of containers between the second row of stamps and the second row of cutting openings responsive to the first row of containers being placed between the second row of stamps and the second row of cutting openings;
- the first set of containers and the second set of containers are placed alternately in the first row of containers, all containers of the first row of containers aligned with each other in a plane, the plane extending to a maximum size of each respective container of the all containers;
- the first set of containers and the second set of containers are aligned in a straight row in a traverse feeding direction; and
- the first stamps in the first row and the second stamps in the second row are arranged a zig-zag pattern in the traverse feeding direction.

2. The separating system according to claim 1, further comprising a forward intermittent feeding mechanism configured to:
- place the first row of containers between the first row of stamps and the first row of cutting openings by intermittently feeding of the plastic web between the stamp plate and the cutting plate; and
- place the first row of containers between the second row of stamps and the second row of cutting openings by intermittently feeding of the plastic web between the stamp plate and the cutting plate.

3. The separating system according to claim 2, wherein the forward intermittent feeding mechanism is configured to place the first row of containers between the first row of stamps and the first row of cutting openings and then place the first row of containers between the second row of stamps and the second row of cutting openings.

4. The separating system according to claim 3, wherein:
- a number of the first plurality of stamps is equal to a number of the first plurality of cutting openings, each respective stamp from the first plurality of stamps being placed above a respective cutting opening from the first plurality of cutting openings; and
- a number of the second plurality of stamps is equal to a number of the second plurality of cutting openings, each respective stamp from the second plurality of stamps being placed above a respective cutting opening from the second plurality of cutting openings.

5. The separating system according to claim 4, wherein:
- each respective cutting opening from the first plurality of cutting openings comprises a first respective cutting edge corresponding to a peripheral edge of a respective container from the first set of containers, the first respective cutting edge being configured to detach the respective container from the first set of containers from the plastic web responsive to the first row of containers being punched between the first row of stamps and the first row of cutting openings; and
- each respective cutting opening from the second plurality of cutting openings comprises a second respective cutting edge corresponding to a peripheral edge of a respective container from the second set of containers, the second respective cutting edge being configured to detach the respective container from the second set of containers from the plastic web responsive to the first row of containers being punched between the second row of stamps and the second row of cutting openings.

6. The separating system according to claim 5, wherein a width of a cutting opening from the second plurality of cutting openings is larger than a width of a cutting opening from the first plurality of cutting openings by a first amount.

7. The separating system according to claim 6, wherein a length of a cutting opening from the second plurality of cutting openings is larger than a length of a cutting opening from the first plurality of cutting openings by a second amount.

8. The separating system according to claim 7, wherein the first amount is two times larger than the second amount.

9. The separating system according to claim 8, wherein the forward intermittent feeding mechanism, the stamp plate, and the cutting plate are configured to place the first row of containers between the second row of stamps and the second row of cutting openings and place the second row of containers between the first row of stamps and the first row of cutting openings simultaneously.

10. The separating system according to claim 9, wherein a cutting opening from the second plurality of cutting openings comprises a first extended edge at a first corner of the first cutting opening.

11. The separating system according to claim 10, wherein the first extended edge is protruded inwardly from a first cutting edge of the first cutting opening.

12. The separating system according to claim 11, wherein a number of the first set of containers is less than a number of the second set of containers by 1.

13. The separating system according to claim 12, wherein the forward intermittent feeding mechanism is configured to place the first row of containers between the second row of stamps and the second row of cutting openings by a forward intermitting movement of the plastic web after that the first row of containers being placed between the first row of stamps and the first row of cutting openings.

14. The separating system according to claim 2, wherein the forward intermittent mechanism comprises:
- a gripping mechanism, comprising:
  - an upper two-wheeled mechanism, comprising:
    - an upper rod configured to rotate around an upper axis;

a first wheel mounted fixedly onto the upper rod; and
a second wheel mounted fixedly onto the upper rod; and
a lower two-wheeled mechanism, comprising:
a lower rod configured to rotate around a lower axis, the lower axis parallel to the upper axis;
a third wheel mounted fixedly onto the lower rod; and
a fourth wheel mounted fixedly onto the lower rod;
an actuator coupled to the lower rod, the actuator configured to rotate the lower rod around the lower axis; and
one or more processors connected to the actuator, the one or more processors configured to control movements of the actuator, and
wherein:
the gripping mechanism is configured to grip the plastic web between the upper two-wheeled mechanism and the lower two-wheeled mechanism; and
the third wheel and the fourth wheel are configured to urge the plastic web to move in a first direction responsive to rotation of the lower rod around the lower axis and in a first rotational direction.

15. The separating system according to claim 2, wherein:
all containers of the first set of containers and the second set of containers comprise a same shape;
all containers of the first set of containers and the second set of containers comprise a same size; and
all containers of the first set of containers and the second set of containers comprise a same depth.

16. A separating system for detaching containers from a plastic web, the plastic web comprising a first row of containers and a second row of containers, the first row of containers comprising a plurality of containers, the separating system comprising:
a stamp plate, comprising:
a first row of stamps comprising a first plurality of stamps, the first plurality of stamps being associated with a first set of containers from the plurality of containers; and
a second row of stamps comprising a second plurality of stamps, the second plurality of stamps being associated with a second set of containers from the plurality of containers;
a cutting plate, comprising:
a first row of cutting openings comprising a first plurality of cutting openings, the first plurality of cutting openings being associated with the first set of containers; and
a second row of cutting openings comprising a second plurality of cutting openings, the second plurality of cutting openings being associated with the second set of containers; and
a forward intermittent feeding mechanism configured to:
place the first row of containers between the first row of stamps and the first row of cutting openings by intermittently feeding of the plastic web between the stamp plate and the cutting plate;
place the first row of containers between the second row of stamps and the second row of cutting openings by intermittently feeding of the plastic web between the stamp plate and the cutting plate; and
place the first row of containers between the first row of stamps and the first row of cutting openings and then place the first row of containers between the second row of stamps and the second row of cutting openings;

wherein:
the first row of stamps and the first row of cutting openings are configured to detach the first set of containers from the plastic web through punching the first row of containers between the first row of stamps and the first row of cutting openings responsive to the first row of containers being placed between the first row of stamps and the first row of cutting openings;
the second row of stamps and the second row of cutting openings are configured to detach the second set of containers from the plastic web through punching the first row of containers between the second row of stamps and the second row of cutting openings responsive to the first row of containers being placed between the second row of stamps and the second row of cutting openings;
the first set of containers and the second set of containers are placed alternately in the first row of containers, all containers of the first row of containers aligned with each other in a plane, the plane extending to a maximum size of each respective container of the all containers;
the first set of containers and the second set of containers are aligned in a straight row in a traverse feeding direction;
a number of the first plurality of stamps is equal to a number of the first plurality of cutting openings, each respective stamp from the first plurality of stamps being placed above a respective cutting opening from the first plurality of cutting openings;
a number of the second plurality of stamps is equal to a number of the second plurality of cutting openings, each respective stamp from the second plurality of stamps being placed above a respective cutting opening from the second plurality of cutting openings;
each respective cutting opening from the first plurality of cutting openings comprises a first respective cutting edge corresponding to a peripheral edge of a respective container from the first set of containers, the first respective cutting edge being configured to detach the respective container from the first set of containers from the plastic web responsive to the first row of containers being punched between the first row of stamps and the first row of cutting openings; and
each respective cutting opening from the second plurality of cutting openings comprises a second respective cutting edge corresponding to a peripheral edge of a respective container from the second set of containers, the second respective cutting edge being configured to detach the respective container from the second set of containers from the plastic web responsive to the first row of containers being punched between the second row of stamps and the second row of cutting openings;
a width of a cutting opening from the second plurality of cutting openings is larger than a width of a cutting opening from the first plurality of cutting openings by a first amount;
a length of a cutting opening from the second plurality of cutting openings is larger than a length of a cutting opening from the first plurality of cutting openings by a second amount;
the first amount is two times larger than the second amount;

the forward intermittent feeding mechanism, the stamp plate, and the cutting plate are configured to place the first row of containers between the second row of stamps and the second row of cutting openings and place the second row of containers between the first row of stamps and the first row of cutting openings simultaneously;

a cutting opening from the second plurality of cutting openings comprises a first extended edge at a first corner of the first cutting opening;

the first extended edge is protruded inwardly from a first cutting edge of the first cutting opening;

a number of the first set of containers is less than a number of the second set of containers by 1;

the forward intermittent feeding mechanism is configured to place the first row of containers between the second row of stamps and the second row of cutting openings by a forward intermitting movement of the plastic web after that the first row of containers being placed between the first row of stamps and the first row of cutting openings;

the forward intermittent mechanism comprises:
a gripping mechanism, comprising:
an upper two-wheeled mechanism, comprising:
an upper rod configured to rotate around an upper axis;
a first wheel mounted fixedly onto the upper rod; and
a second wheel mounted fixedly onto the upper rod; and
a lower two-wheeled mechanism, comprising:
a lower rod configured to rotate around a lower axis, the lower axis parallel to the upper axis;
a third wheel mounted fixedly onto the lower rod; and
a fourth wheel mounted fixedly onto the lower rod;
an actuator coupled to the lower rod, the actuator configured to rotate the lower rod around the lower axis; and
one or more processors connected to the actuator, the one or more processors configured to control movements of the actuator;

the gripping mechanism is configured to grip the plastic web between the upper two-wheeled mechanism and the lower two-wheeled mechanism; and the third wheel and the fourth wheel are configured to urge the plastic web to move in a first direction responsive to rotation of the lower rod around the lower axis and in a first rotational direction;

all containers of the first set of containers and the second set of containers comprise a same shape;

all containers of the first set of containers and the second set of containers comprise a same size; and all containers of the first set of containers and the second set of containers comprise a same depth.

* * * * *